3,275,421
RECOVERY OF ACTINIDES FROM HALITE DEBRIS
David G. Karraker and William C. Perkins, Aiken, S.C., assignors to the United States of America as represented by the United States Atomic Energy Commission
No Drawing. Filed Apr. 16, 1965, Ser. No. 448,900
8 Claims. (Cl. 23—319)

The present invention relates to the recovery of actinide values, and more particularly to the recovery and concentration of actinide values from halite debris produced by a nuclear detonation in halite strata.

For the purpose of this specification, halite may be defined as the mineral comprising predominantly sodium chloride evaporite deposits, together with impurities generally associated with those deposits in a geologic stratum. Although halite deposits may vary considerably in composition, they generally comprise approximately 80 to 95% sodium chloride, with the remaining fraction consisting of various impurities, including calcium sulfate and magnesium sulfate minerals, olivine ($Mg_2SiO_4$—$MgFeSiO_4$) and various clay minerals generally associated with these deposits.

Halite debris may be defined, for the purpose of this specification, as the material (particles, rubble, boulders, solidified melt, etc.) resulting from a nuclear or thermonuclear detonation in halite strata, and containing, in addition to the above described impurities, relatively small quantities of valuable actinide elements.

The usual method for the production of heavier isotopes in susbtantial quantities is by irradiation of target isotopoes in a nuclear reactor, and depending upon the neutron capture cross section and the extent of radiation, an increase in mass number of from one to three units is not difficult to achieve. However, such a method usually requires a considerable period of time to produce even gram quantities of some of the more desirable heavier isotopes. The detonation of a special nuclear or thermonuclear device, which is accompanied by an intense neutron flux, may also be used to produce heavier isotopes, particularly transplutonium actinides, in larger quantities and more rapidly than may be produced in nuclear reactors. Thus, the detonation of a nuclear device can provide a source of neutrons that can add fifteen or more neutrons to a target nucleus within an instant, producing heavier isotopes that would require decades to produce in a nuclear reactor, if they could be produced at all. Heretofore, this method of producing quantities of transuranium actinides has not been considered feasible because of the formidable task of recovering the actinide values from the material used to contain the nuclear detonation. It has been recognized that a desirable containment material for such a nuclear detonation is the various underground halite strata and/or salt domes, consisting primarily of the mineral halite, which exist in many favorable locations in the United States. It is estimated that approximately 500 tons of halite are melted per kiloton of energy released in an underground nuclear detonation in halite strata. Accordingly, a 10 kiloton nuclear detonation will melt approximately 5000 tons of salt and the total quantity of debris will be increased by spallation and fracturing of halite from the roof of the surrounding cavity to produce between 20,000 and 30,000 tons; thus the few grams of actinides produced are mixed with thousands of tons of halite debris. Therefore, to recover gram qualities of actinide values produced by the detonation requires a concentration factor of about $10^9$.

Heretofore, the distribution of the actinide elements dispersed in a halite strata after the neutron bombardment of a target element has not been known. Accordingly, the separation of gram quantities of actinide values from these large quantities of halite debris is a formidable task.

Therefore, it is an object of this invention to provide a process for the recovery of actinide values resulting from a nuclear detonation in halite strata.

It is another object of this invention to provide a simple and economical process for the recovery of actinide values from halite debris.

Still another object of the present invention is to provide a method of separating relatively small quantities of actinide values from relatively large quantities of halite debris resulting from a nuclear or thermonuclear detonation in halite strata.

In accordance with the present invention, applicants have found that substantially all the actinide values rather unexpectedly remain in the water-insoluble residue resulting from dissolution of the halite debris in water. Further, applicants have discovered that the actinide values are not merely associated with the water-insoluble residue by surface absorption, but are distributed through the bulk of the insoluble residue particles. This result is particularly surprising in view of the small quantities of actinides resulting from a nuclear detonation, the large volume of halite debris for distribution of these actinides and the nature of the nuclear detonation. Although our invention is not to be understood as limited to a particular theory, it has been suggested that the minor constituents or trace elements in the halite strata serve as "carriers" for the actinide values by collecting the actinide values in a separate solid phase during post-detonation condensation of the halite debris. Thus, it has been found that by contacting the halite debris with a sufficient quantity of water, essentially all of the halite is dissolved, providing a water-insoluble residue containing substantially all of the actinide values originally present in the halite debris. The insoluble residue resulting from the dissolution of halite with water may be further treated for recovery and subsequent concentration of actinide values by removing the solution containing the water-soluble portion of the debris to leave a water-insoluble residue containing the actinide values together with other insoluble impurities, such as sulfates and silicates, treating the insoluble residue with an aqueous solution of an ammonium salt to remove the insoluble sulfates, contacting the sulfate-free insoluble residue with a mineral acid to dissolve the residue, and thereafter separating the actinide values from the resulting solution. After adjusting the solution to the proper acidity, final recovery of actinide values is completed by conventional ion exchange or solvent extraction processes well known in the art of actinide recovery.

To facilitate dissolution of the halite debris, it is preferable that the debris be reduced to a finely comminuted state using conventional crushing and grinding equipment. The fineness of the debris is not particularly critical, but it should be ground sufficiently to insure rapid dissolution of the water-soluble salts and complete separation of the water-insoluble portion as a residue. Although a greater degree of fineness will provide a faster dissolution rate, a fineness of debris capable of passing a 50 mesh (U.S. Sieve Series) screen has proved to be suitable.

The comminuted halite debris is then placed in a suitable dissolution vessel and contacted with sufficient water to dissolve substantially all of the water-soluble salts such as the sodium chloride and potassium chloride. This dissolution is conducted under ambient conditions with sufficient agitation to provide complete contact between the debris and the water. While the water used for this dissolution should be as pure as possible to provide rapid and complete dissolution of the water-soluble salts, it has been found that adequate results are also obtained by using relatively impure water containing large concentratrations of alkaline salts, such as might be obtained in the vicinity of the halite stata. This is particularly desirable in view of the large quantity of debris to be treated with water. For instance, adequate dissolution of the water-soluble portions of the debris was provided by contacting with water saturated in calcium sulfate. The dissolution step and subsequent steps may be conducted in a large reaction vessel, capable of withstanding the subsequent mineral acid dissolution of the water-insoluble residues. A preferred material for a reaction vessel is stainless steel. The dissolution step is conducted in batches and the salt-saturated solution removed until sufficient water-insoluble residue is accumulated for further processing.

The water-insoluble material remaining after dissolution of the water-soluble salts comprises essentially mixed sulfate and silicate minerals, together with substantially all of the actinide values that are present in the original debris. The major cations present are magnesium, calcium and iron.

The calculated composition of the water-insoluble fraction of two representative debris samples is shown in Table I.

Table I.—*Calculated composition of water-insoluble fractions*

| Component | 'F' Sample, weight percent | Drift Component Sample, weight percent |
|---|---|---|
| $CaSO_4$ | 62 | 11 |
| $MgSO_4$ | 16 | |
| Olivine (combined $Mg_2SiO_4$ and $MgFeSiO_4$) | 20.5 | 40 |
| $SiO_2$ (excluding Olivine) | | 43 |
| NaCl | | 5 |
| Fe | 2.5 | 10 |

The minor constituents, in addition to the actinides, include aluminum, lead, copper, titanium, chromium, nickel, manganese and molybdenum.

The water-insoluble residue is then treated to remove sulfate ions by contacting with an aqueous solution of a suitable ammonium salt; such as, ammonium nitrate, ammonium acetate, ammonium chloride, or ammonium carbonate. While all of these salts removed sulfate ions, ammonium carbonate is preferred because it removes substantially all of the sulfates with practically no loss of actinide values. Although the quantity of ammonium carbonate solution used is not critical, there should be sufficient to provide at least a 200% stoichiometric excess of ammonium carbonate solution for complete metathesis of the sulfate ions. This metathesis with ammonium carbonate solution is also conducted under ambient conditions with some agitation to insure contact between the carbonate solution and the insoluble residue. It has been found that less than 1% of the actinides present in the insoluble residue are lost during this metathesis.

After removal of the sulfates, by carbonate metathesis, the actinides are dissolved from the remaining water-insoluble residue by contacting with a mineral acid, preferably nitric acid at an elevated temperature. While the reaction time, temperature and volume of nitric acid required will vary considerably depending upon the exact composition of the water-insoluble residue, it has been found that boiling the residue in nitric acid having a concentration between 1 M and 8 M dissolved most of the residue and leached the actinide values from the residue more efficiently than treatment at room temperature. Optimum actinide recoveries were obtained by treating the water-insoluble residue with boiling 6 M nitric acid for about 6 hours followed by a second 6 hour treatment if a substantial quantity of actinide values remain undissolved. It has been found that between 85% and 97% of the actinide values are dissolved using this treatment. If dissolved silica remains in the solution in sufficient quantity to interfere with subsequent process recovery, it is precipitated by the addition of gelatin and the solution filtered to clarify the solution and remove the coagulated silica.

After the solution, containing substantially all of the actinide values, is clarified and the acid concentration adjusted to suitable level, it is then treated for final removal of the actinide values by suitable conventional means, such as ion exchange or solvent extraction. While either method for recovery of the actinides may be used, solvent extraction with tri-n-butyl phosphate is preferred because solvent extraction processes can tolerate higher levels of residual chloride concentration without any serious effect on efficiency. To use the actinide solution as feed for a solvent extraction process, the solution is preferably neutralized with a base (sodium or ammonium hydroxide) to a final concentration of 6 M total nitrate– 0.1 nitric acid.

The present invention is further illustrated by the following specific examples:

EXAMPLE I

A 1 kg. sample of halite debris from a nuclear detonation containing unburned plutonium and curium–242 tracer was comminuted to —50 mesh and leached with 4 liters of boiling impure water (nearly saturated with $CaSO_4$) for 2 hours. The resulting water leach solution was removed by filtration. The remaining water-insoluble residue (122 g.) was stirred in contact with 400 ml. of 1 M $(NH_4)_2CO_3$ for 2 hours to metathesize the insoluble sulfates. The sulfate-free residue (119 g.) was again recovered by filtration and leached for 6 hours with 1 liter of boiling 6 M $HNO_3$. After allowing the leach solution to stand for 16 hours the clear supernate was decanted and the residue leached a second time with 500 ml. 6 M $HNO_3$ by boiling for 6 hours. The second leach solution was decanted and the residue rinsed with $H_2O$ and filtered.

The 6 M $HNO_3$ dissolved 54% of the water-insoluble residue and the leaching of the actinides values was virtually complete as indicated by the following Table II which shows the radioactivity of the various process fractions.

Table II.—*Radioactivity of process fractions*

| Fraction | Gross Alpha [1] | | Gross Gamma | |
|---|---|---|---|---|
| | Dis./min. | Percent | Cts./min. | Percent |
| $H_2O$ Leach Solution | $0.4\times10^6$ | 0.3 | $8.0\times10^6$ | 4.3 |
| $(NH_4)_2CO_3$ Supernate | $0.8\times10^6$ | 0.6 | $0.9\times10^6$ | 0.5 |
| 6 M $HNO_3$ Supernate | $85.5\times10^6$ | 63 | $104\times10^6$ | 55 |
| $H_2O$ Rinses | $35.1\times10^6$ | 26 | $42\times10^6$ | 23 |
| Filtrate | $10.9\times10^6$ | 9.0 | $18\times10^6$ | 9.6 |
| Acid-Insoluble Residue | $3.7\times10^6$ | 2.7 | $15\times10^6$ | 8.3 |
| Total | $136\times10^6$ | ~100 | $188\times10^6$ | ~100 |

[1] >99% mixed Pu isotopes.

It is apparent from this table that very small quantities of actinides, as represented by the alpha radioactivity, are lost during water-dissolution and during $(NH_4)_2CO_3$ metathesis of the halite debris and that substantially all of the actinide values remain in the water-insoluble residue to be recovered by subsequent process steps. It can also be seen that 89% of the actinides are recovered by the nitric acid leach and associated rinses from the residue and less than 3% was retained in the solid residue after treatment in boiling 6 M $HNO_3$. These results are generally confirmed by the complementary results of the gamma activity analysis of the same fractions.

EXAMPLE II

A 3.1 kg. composite debris sample containing plutonium and curium isotopes was comminuted to —50 mesh. The sample radiation level was 60 mr./hr. measured three inches from the surface. The comminuted debris was leached by heating one hour with 11.1 liters of impure water and filtered to leave a water-insoluble residue weighing 290 g. This water-insoluble residue was given two consecutive treatments with 855 ml. and 305 ml., respectively, of 1.84 M $(NH_4)_2CO_3$ solution (equivalent to 4.1 ml. $(NH_4)_2CO_3$ per gram of residue) to metathesize the insoluble sulfates. The sulfate-free residue (262 g.) was leached by six successive treatments with nitric acid—the first three treatments with ~1.5 M $HNO_3$, the next two with ~3 M $HNO_3$, and the final treatment with 6 M–8 M $HNO_3$. For the first five acid treatments, the solid residue was stirred in the acid solution for one hour at 75° C.; then 100 to 500 p.p.m. gelatin was added to aid filtration and the solution was stirred for 30 minutes as the solution cooled. After each acid treatment the solids were filtered, and dried. After five treatments, the remaining solids were boiled in 400 ml. of 8.1 M $HNO_3$ for four hours; then the solution was adjusted to 6 M $HNO_3$, and the residue was boiled in the solution for two additional hours. Only 60 g. of residue remained after this final treatment. The results of this experiment are shown in the following Table III.

*Table III.—Dissolution of radioactivity*

| Fractions | Gross Alpha [1] | | Gross Gamma | |
|---|---|---|---|---|
| | Dis./min | Percent | Cts./min | Percent |
| $H_2O$ Leach | $0.24 \times 10^6$ | 0.1 | $17 \times 10^6$ | 4.3 |
| $(NH_4)_2CO_3$ Supernate | $0.31 \times 10^6$ | 0.1 | $5.5 \times 10^6$ | 1.4 |
| Nitric Acid Dissolutions: | | | | |
| 1.5 M $HNO_3$ | $82 \times 10^6$ | 30 | $99 \times 10^6$ | 25 |
| 1.5 M $HNO_3$ | $56 \times 10^6$ | 21 | $37 \times 10^6$ | 9.3 |
| 1.5 M $HNO_3$ | $2.5 \times 10^6$ | 0.9 | $36 \times 10^6$ | 9.0 |
| 3 M $HNO_3$ | $67 \times 10^6$ | 24 | $79 \times 10^6$ | 19.8 |
| 3 M $HNO_3$ | $25 \times 10^6$ | 9.2 | $39 \times 10^6$ | 9.8 |
| 8–6 M $HNO_3$ | $31 \times 10^6$ | 11.3 | $87 \times 10^6$ | 21.7 |
| Total | $264 \times 10^6$ | 96.6 | $400 \times 10^6$ | 100.3 |
| Acid-Insoluble Residue | $91 \times 10^6$ | 3.3 | | |

[1] Mixed Pu Isotopes.

While this table further substantiates and exemplifies the results obtained in Example I, the beneficial effect of the higher nitric acid concentration is readily apparent. The first three acid leaches using 1.5 M $HNO_3$ only recovered 52% of the actinide values and at least 6 M $HNO_3$ at elevated temperature was required to recover substantially all of the actinide values from the residue.

The foregoing description and examples are not intended to restrict the scope of this invention and the invention is to be constructed as limited only to the extent indicated by the appended claims.

What is claimed is:
1. A process for the recovery of actinide values from actinide containing halite debris which comprises contacting said debris with a sufficient quantity of water to dissolve substantially all of said halite, removing said solution containing said halite to provide an insoluble residue containing said actinide values together with insoluble sulfates, silicates and other insoluble impurities, treating said insoluble residue with a soluble ammonium salt selected from the group consisting of ammonium carbonate, ammonium chloride, ammonium acetate and ammonium nitrate to remove said insoluble sulfates, contacting said sulfate-free insoluble residue with a mineral acid to dissolve said residue, and thereafter separating said actinide values from said solution.

2. The process of claim 1 wherein said soluble ammonium salt consists of a stoichiometric excess of ammonium carbonate.

3. The process of claim 1 wherein said mineral acid is boiling nitric acid having a concentration of at least one molar.

4. The process of claim 1 wherein said solution is adjusted to a total nitrate concentration of approximately 6 M prior to separating said actinide values from said solution.

5. The process of claim 1 wherein said actinide values are separated from said solution by solvent extraction with dilute tri-n-butyl phosphate.

6. A process for the recovery of actinide values from halite debris containing said values together with extraneous impurities which comprises reducing said debris to a finely divided state, contacting said finely divided debris with a sufficient quantity of water to dissolve substantially all of said halite and to provide an insoluble residue containing said actinide values, and thereafter separating said actinide values from said insoluble residue.

7. A process for the recovery of actinide values from halite debris containing said values together with extraneous impurities which comprises reducing said debris to a relatively finely divided state, contacting said finely divided debris with a sufficient quantity of water to dissolve substantially all of said halite and to provide an insoluble residue containing said actinide values together with insoluble sulfates, silicates, and other impurities, treating said residue with a solution of ammonium carbonate in sufficient quantity to metathesize said insoluble sulfates, contacting the metathesized residue with boiling nitric acid having a concentration of at least one molar to dissolve said residue, and thereafter separating said actinide values from said solution.

8. A process for the recovery of actinide values from a relatively large quantity of halite debris containing a small amount of actinide values resulting from a nuclear detonation in a halite stratum which comprises reducing said halite debris to a relatively finely divided state, contacting said finely divided debris with a sufficient quantity of water to dissolve substantially all of said halite and to provide an insoluble residue containing said actinide values together with insoluble sulfates, silicates, and other impurities, treating said residue with an aqueous solution of ammonium carbonate in sufficient quantity to metathesize said insoluble sulfates, contacting the metathesized residue with boiling nitric acid to dissolve said residue, and thereafter separating said actinide values from said solution.

No references cited.

BENJAMIN R. PADGETT, *Acting Primary Examiner.*

S. TRAUB, *Assistant Examiner.*